United States Patent
Takahashi et al.

(10) Patent No.: US 10,873,873 B2
(45) Date of Patent: Dec. 22, 2020

(54) COMMUNICATION LOAD ESTIMATION SYSTEM, INFORMATION PROCESSING DEVICE, METHOD, AND PROGRAM

(71) Applicant: NEC Corporation, Tokyo (JP)

(72) Inventors: Eiji Takahashi, Tokyo (JP); Daisuke Ohta, Tokyo (JP); Takeo Onishi, Tokyo (JP); Takahiro Shiroshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 16/065,188

(22) PCT Filed: Dec. 19, 2016

(86) PCT No.: PCT/JP2016/087828
§ 371 (c)(1),
(2) Date: Jun. 22, 2018

(87) PCT Pub. No.: WO2017/119275
PCT Pub. Date: Jul. 13, 2017

(65) Prior Publication Data
US 2019/0028921 A1    Jan. 24, 2019

(30) Foreign Application Priority Data
Jan. 5, 2016    (JP) .................. 2016-000615

(51) Int. Cl.
*H04W 28/02*    (2009.01)
*H04W 24/08*    (2009.01)
(Continued)

(52) U.S. Cl.
CPC ...... *H04W 28/0284* (2013.01); *H04B 17/309* (2015.01); *H04W 24/08* (2013.01);
(Continued)

(58) Field of Classification Search
None
See application file for complete search history.

(56) References Cited

U.S. PATENT DOCUMENTS

2013/0324108 A1    12/2013  Oekvist et al.
2014/0204765 A1*    7/2014  Chai .................. H04L 5/0073
                                              370/241.1
(Continued)

FOREIGN PATENT DOCUMENTS

| JP | 2015-133700 A | 7/2015 |
| WO | 2014/185048 A1 | 11/2014 |
| WO | 2015/159616 A1 | 10/2015 |

OTHER PUBLICATIONS

International Search Report of PCT/JP2016/087828 dated Jan. 24, 2017 [PCT/ISA/210].

*Primary Examiner* — Andre Tacdiran
(74) *Attorney, Agent, or Firm* — Sughrue Mion, PLLC

(57) ABSTRACT

A communication load estimation system is provided with a load estimation means 501 for estimating a communication load of a wireless base station to be an object of estimation, using at least: a network parameter which is a parameter concerning the number of antennas used for signal transmission of the wireless base station; a first quality measurement value which is a measurement value concerning a quality of communication with the wireless base station and which includes at least total reception power; and a second quality measurement value which is a measurement value concerning a quality of communication with the wireless base station and which includes at least a signal to interference noise ratio of a reference signal.

5 Claims, 10 Drawing Sheets

(51) Int. Cl.
*H04B 17/309* (2015.01)
*H04L 5/00* (2006.01)
(52) U.S. Cl.
CPC ....... *H04W 28/02* (2013.01); *H04W 28/0236* (2013.01); *H04L 5/0048* (2013.01)

(56) References Cited

U.S. PATENT DOCUMENTS

| | | | | |
|---|---|---|---|---|
| 2014/0362787 | A1* | 12/2014 | Mobasher | H04W 52/146 370/329 |
| 2015/0195737 | A1* | 7/2015 | Tabet | H04L 43/0888 455/405 |
| 2016/0043843 | A1* | 2/2016 | Liu | H04W 72/0446 370/329 |
| 2016/0338145 | A1* | 11/2016 | Bhanage | H04W 12/08 |
| 2017/0034725 | A1* | 2/2017 | Negishi | H04W 24/08 |
| 2017/0201363 | A1* | 7/2017 | Son | H04B 7/0639 |

* cited by examiner

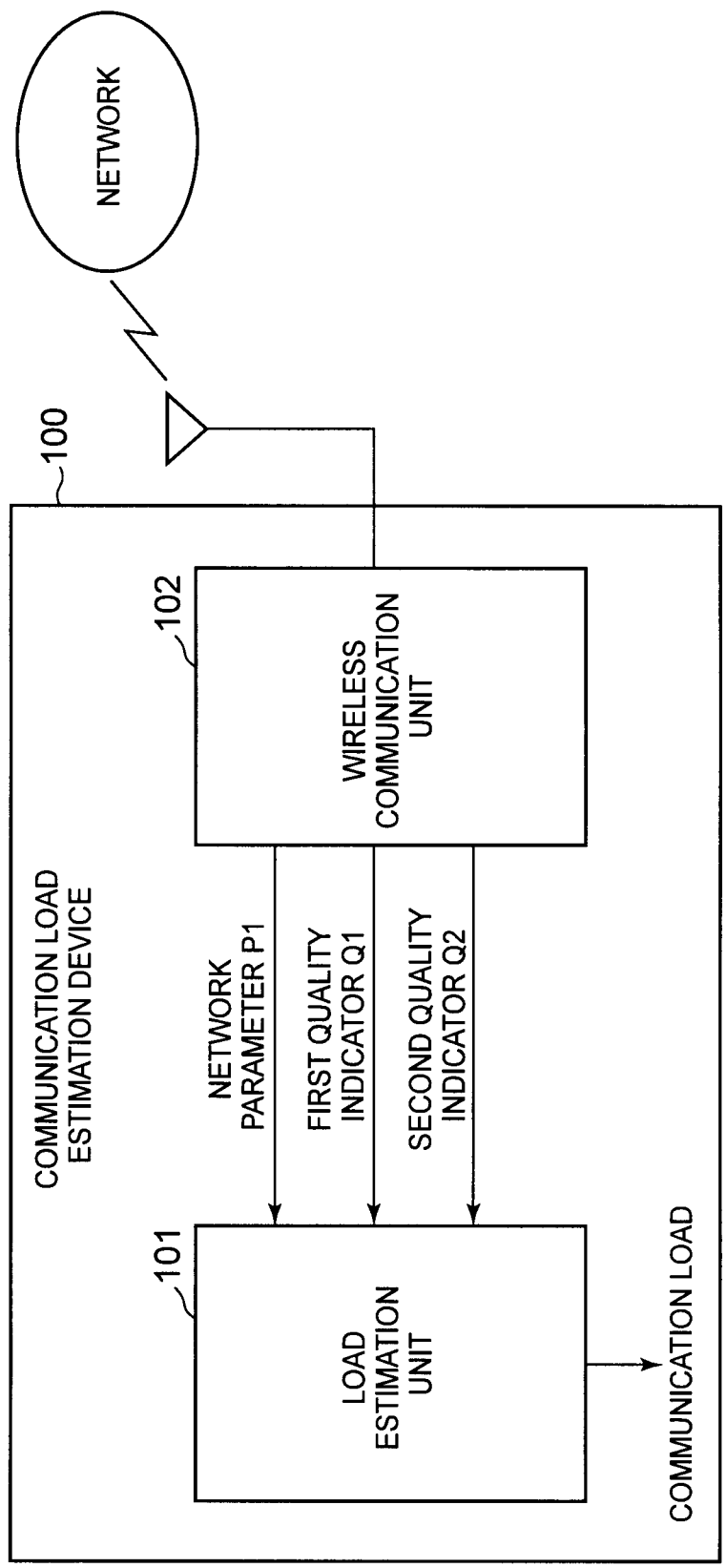

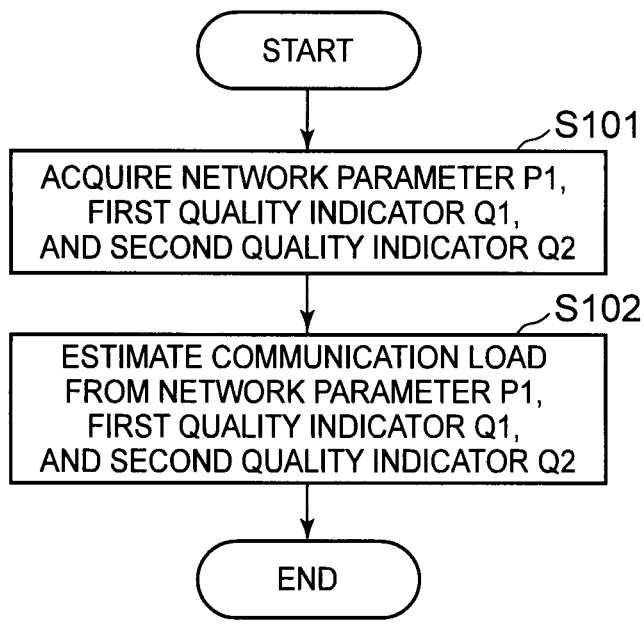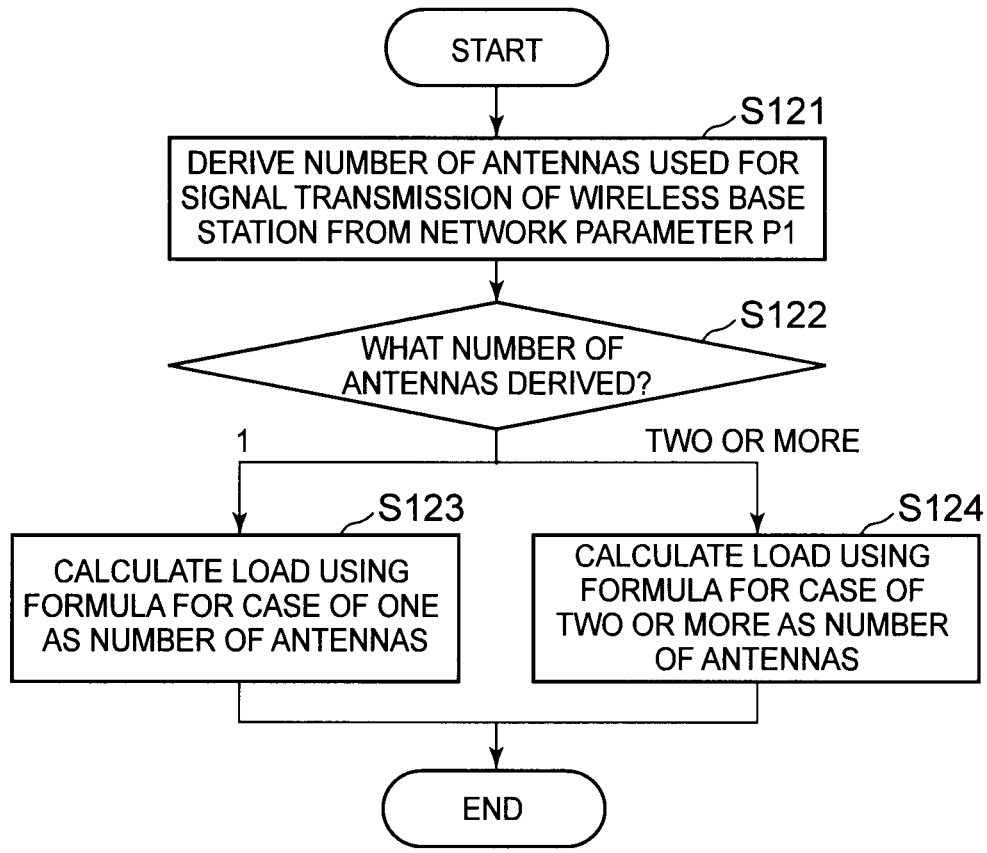

COMMUNICATION LOAD ESTIMATION SYSTEM, INFORMATION PROCESSING DEVICE, METHOD, AND PROGRAM

CROSS REFERENCE TO RELATED APPLICATIONS

This application is a National Stage of International Application No. PCT/JP2016/087828, filed Dec. 19, 2016, claiming priority based on Japanese Patent Application No. 2016-000615, filed Jan. 5, 2016, the contents of all of which are incorporated herein by reference in their entirety.

TECHNICAL FIELD

The present invention relates to a communication load estimation system for estimating a communication load of a wireless base station, an information processing device, a communication load estimation method, and a communication load estimation program.

BACKGROUND ART

In a mobile network, various traffic data are mixed and treated equally without any distinction, like in not only traffic data such as Web browsing data, video viewing data, and communication data, having high real-time property but also in traffic data such as downloaded content, and updated application data having low real-time property. Therefore, there has been a problem that an occurrence of a peak load reduces the communication quality of all traffic data.

There is an off-peak data transfer technology for intermittently transferring traffic data such as downloaded content having low real-time property when load of a wireless base station is low. The off-peak data transfer technology enables the peak load of the wireless base station to be leveled without reducing the communication quality of the traffic data such as Web browsing data, having high real-time property.

The off peak data transfer technology has a problem that how the communication load of the wireless base station should be accurately grasped. With respect to a technique of estimating a communication load, for example, Patent Document 1 discloses a method of estimating a communication load of a wireless base station by using total received power and a signal to interference noise ratio of a reference signal.

CITATION LIST

Patent Literature

PTL 1: WO 2014/185048

SUMMARY OF INVENTION

Technical Problem

The problem is that, when the wireless base station uses two or more antennas for signal transmission, the estimation accuracy of the communication load decreases. The reason why is that, when the wireless base station uses two or more antennas for signal transmission, although the communication load of the wireless base station and a relationship between the total received power and the signal to interference noise ratio of the reference signal change, the method described in PTL 1 estimates the communication load on the premise of one antenna as the number of antennas.

Therefore, it is an object of the present invention to provide a communication load estimation system, an information processing device, a communication load estimation method, and a communication load estimation program capable of accurately estimating the communication load of the wireless base station.

Solution to Problem

According to an aspect of the present invention, there is provided a communication load estimation system including load estimation means for estimating a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

According to another aspect of the present invention, there is provided a communication load estimation system including: provisional load calculation means for calculating a provisional communication load of a wireless base station to be an object of estimation, using at least a first quality measurement value, which is a measurement value concerning a quality of communication with the wireless base station and which includes at least total received power, and a second quality measurement value, which is a measurement value concerning a quality of communication with the wireless base station and which includes at least a signal to interference noise ratio of a reference signal; and load adjustment means for estimating the communication load of the wireless base station by adjusting the magnification or offset of the provisional communication load or both thereof, based on the range of value of the provisional communication load represented by a set of the provisional communication loads.

According to still another aspect of the present invention, there is provided an information processing device including load estimation means for estimating a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

According to further another aspect of the present invention, there is provided a communication load estimation method wherein an information processing device, which is connectable to a wireless terminal or a wireless communication means included in the wireless terminal, estimates a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

According to still another aspect of the present invention, there is provided a communication load estimation program for causing a computer to perform processing of estimating a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

Advantageous Effects of Invention

The present invention enables a provision of a communication load estimation system, an information processing device, a communication load estimation method, and a communication load estimation program capable of accurately estimating a communication load of a wireless base station.

BRIEF DESCRIPTION OF DRAWINGS

FIG. 1 is a block diagram illustrating a configuration example of a communication load estimation device of a first exemplary embodiment.

FIG. 2 is a flowchart illustrating an example of an operation of the communication load estimation device of the first exemplary embodiment.

FIG. 3 is a flowchart illustrating an example of a more detailed flow of a load estimation unit 101.

DESCRIPTION OF EMBODIMENT

Exemplary Embodiment 1

Figure 4A:
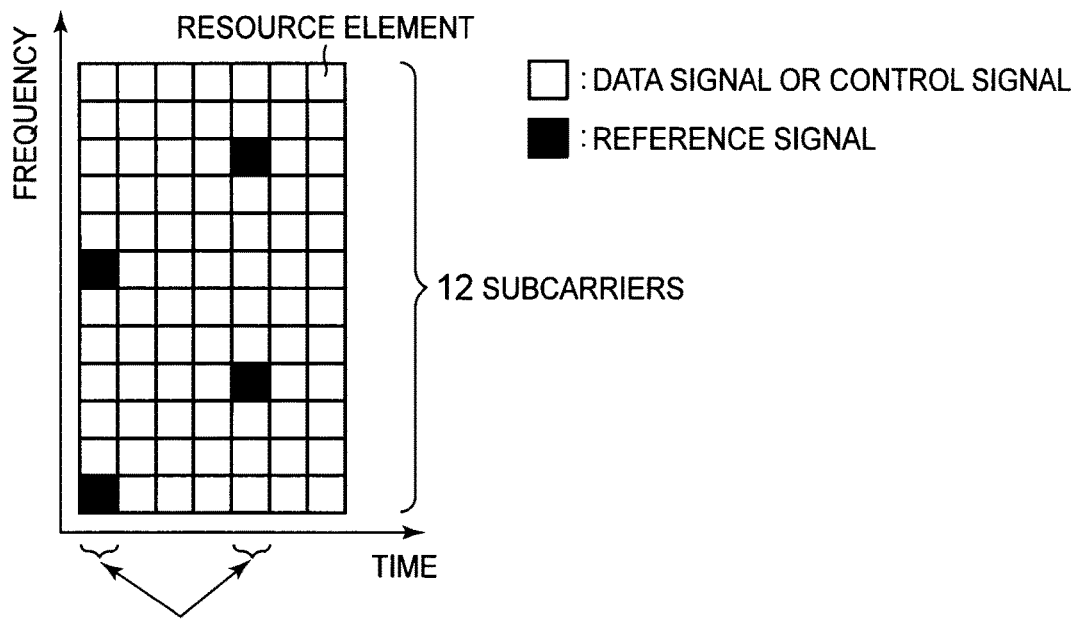
FIGS. 4(a) and 4(b) are explanatory diagrams illustrating an example of a resource block configuration of symbols to be measured such as a total received power or a signal to interference noise ratio of a reference signal.

Hereinafter, an exemplary embodiment of the present invention will be described with reference to drawings. FIG. 1 is a block diagram illustrating a configuration example of a communication load estimation device of a first exemplary embodiment. The communication load estimation device 100 illustrated in FIG. 1 includes a load estimation unit 101 and a wireless communication unit 102.

The wireless communication unit 102 acquires a network parameter P1 concerning the number of antennas used for signal transmission by a wireless base station, a first quality indicator Q1 which is a quality measurement value including at least total received power, a second quality indicator Q2 which is a quality measurement value including at least a signal to interference noise ratio of a reference signal.

The load estimation unit 101 estimates a communication load of a wireless base station by using a network parameter P1 acquired by the wireless communication unit 102, the first quality indicator Q1, and the second quality indicator Q2.

The load estimation unit 101 may use previously set information as the network parameter P1 or may use information previously stored in a predetermined storage device such as a storage device provided in the communication load estimation device. In that case, the acquisition processing of the network parameter P1 in the wireless communication unit 102 is omitted. Moreover, the load estimating unit 101 may acquire the network parameter P1 from an information processing device such as a server device or the like connected to the communication load estimation device 100 via a communication network.

The network parameter P1 may be the number of transmitting antennas used for signal transmission by a wireless base station, itself, or may be another indicator that correlates with the number of antennas.

The first quality indicator Q1 is a measurement value concerning a quality of communication and only needs to include total received power. The first quality indicator Q1 may include, for example, a received signal strength indicator (RSSI), a reference signal received quality (RSRQ), or the like.

The second quality indicator Q2 is a measurement value concerning a quality of communication and only need to include a signal to interference noise ratio of a reference signal. The second quality indicator Q2 may include, for example, a signal to interference plus noise ratio (SINR) or the like.

The communication load estimation device 100 may be, for example, a wireless terminal. In that case, the load estimation unit 101 is implemented by an information processing device which operates according to a program, such as, for example, a CPU provided in the wireless terminal. In addition, the load estimating unit 101 may be implemented by the CPU or the like provided in the information processing device such as a server device or the like connected via a communications network to a wireless terminal having a wireless communication unit 102, in addition to being provided in the wireless terminal. In that case, the communication load estimation device 100 is a communication load estimation system including two or more devices.

The load estimation unit 101 performs communication load estimation described later, in the wireless terminal or in the information processing device.

The wireless communication unit 102 is provided in, for example, the wireless terminal and observes radio waves from the wireless base station as the object of estimation in the wireless terminal to acquire the network parameter P1, the first quality indicator Q1, the second quality indicator Q2, and the like.

Subsequently, the operation of this exemplary embodiment will be described. FIG. 2 is a flowchart illustrating an example of the operation of the communication load estimation device 100 of this exemplary embodiment. In the example illustrated in FIG. 2, first, the wireless communication unit 102 acquires the network parameter P1, the first quality indicator Q1, and the second quality indicator Q2 (step S101). Subsequently, the load estimation unit 101 estimates (calculates) the communication load of the wireless base station on the basis of the network parameter P1, the first quality indicator Q1, and the second quality indicator Q2 (step S102).

FIG. 3 is a flowchart illustrating an example of a more detailed flow of communication load estimation processing of the wireless base station (the above step S102) in the load estimation unit 101. As illustrated in FIG. 3, the load estimation unit 101 may derive the number of antennas used for signal transmission of the wireless base station from, for example, the network parameter P1 (step S121), determine a formula in accordance with the number of antennas that has been derived in the above (step S122), and calculate a communication load of the wireless base station as the object of estimation, using the determined formula (steps S123 and S124).

As a specific method of calculating the communication load, a component containing an interference noise component, which is included in the signal to interference noise ratio of the second quality indicator Q2, may be subtracted from the component containing the total received power of the first quality indicator Q1. It is assumed, however, that the selected formula contains a difference caused by the configuration of resource blocks in the symbol used for the measurement of the measurement value concerning the quality of communication, which varies with the number of antennas. For example, when the RSSI is decomposed in components, the RSSI is divided into received power of the reference signal, received power of a data signal and a control signal, interference power, and a noise. The received power of the reference signal or the number of resource elements of the reference signal, the received power of the data signal and the control signal, and the number of resource elements of the data signal and the control signal in the symbols to be measured such as RSSI, RSRP, RSRQ, and SINR depend on the number of antennas used for signal transmission of the wireless base station. Therefore, it is preferable to select a formula reflecting such differences.

Hereinafter, a description will be made on a method of calculating the communication load of the wireless base station with reference to a long term evolution (LTE) system as an example.

Figure 4B:
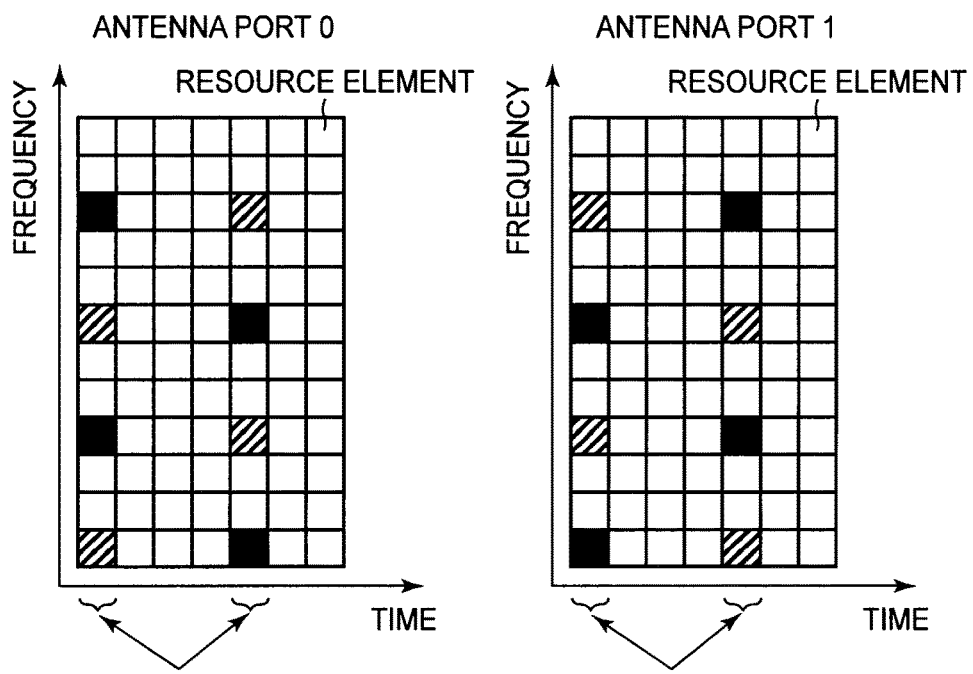

FIGS. 4(*a*) and 4(*b*) are explanatory diagrams illustrating an example of a resource block configuration used for the orthogonal frequency division multiple access (OFDM). FIG. 4 (*a*) illustrates an example of a resource block configuration when the number of antennas used for signal transmission is one, and FIG. 4 (*b*) illustrates an example of a resource block configuration when the number of antennas is two. In the figure, an individual square corresponds to a resource element. The OFDM symbol at a certain time includes not only a data signal and a control signal, but also a reference signal. In the case where the number of antennas is two or more, unused resource elements are contained in some cases as illustrated in FIG. 4 (*b*).

For example, if the number of antennas used for signal transmission is one, the relationship between wave indicators may be represented as follows.

$$RSSI/N_{RB} = 2RSRP_k + 10u_k RSRP_k + (12 RSRP_k / SINR_k) \quad (1)$$

On the other hand, in the case where the number of antennas used for signal transmission is $N_{TX}$, the relationship between the wave indicators may be represented as follows.

$$RSSI/N_{RB} = 4RSRP_k + 8u_k N_{TX} RSRP_k + (12 RSRP_k / SINR_k) \quad (2)$$

According to the formulae (1) and (2), it is understood that RSSI as the total received power including interference power and noise can be represented by a sum of three terms. Incidentally, RSSI represents the received signal power of an OFDM symbol in which a reference signal is multiplexed. Moreover, $N_{RB}$ represents the total number of resource blocks of a wireless base station (in the case of an LTE system, the total number of resource blocks of the LTE system bandwidth). Furthermore, $RSRP_k$ represents the received signal power per one resource element of the reference signal in the cell k of the wireless base station as the object of estimation. Moreover, $u_k$ represents the communication load of the cell k of the wireless base station as the object of estimation. Furthermore, $SINR_k$ represents the ratio between the received signal power of the reference signal of the cell k of the wireless base station as the object of estimation and a sum of the interference signal power and noise power.

In view of the formulae (1) and (2), it is understood that RSSI as the total received power is divided into a term related to the reference signal (the first term on the right side), a term related to the data signal and the control signal (the second term on the right side), and a term related to interference power and noise (the third term on the right side). Furthermore, it is understood that the degree of contribution to RSSI of each term depends on whether the number of antennas is one or two or more.

In this exemplary embodiment, the communication load is enabled to be calculated accurately by subtracting the component containing the interference noise component included in the signal to interference noise ratio in the second quality indicator Q2 from the component containing the total received power of the first quality indicator Q1 in consideration of the degree of contribution to the total received power of each term.

As an example, the load estimation unit 101 may use the following formula properly according to, for example, the number of antennas $N_{TX}$ used for signal transmission of the cell k of the wireless base station when calculating the communication load $u_k$ of the cell k of the wireless base station, which is the object of estimation in LTE.

Specifically, if the number of antennas $N_{TX}$ used for signal transmission of the cell k of the wireless base station is one, the communication load $u_k$ may be calculated by using any one of the following formulae (1-1), (1-2), (1-3), (1 4), (1-5), (1-6), (1-7), (1-8), and (1-9). Incidentally, the calculation formula is not limited thereto, but any other mathematical formula predetermined based on the resource block configuration may be used.

[Math. 1]
$$u_k = \frac{1}{5}\left(\frac{RSSI}{2 \cdot N_{RB} \cdot RSRP_k} - \frac{6}{SINR_k} - 1\right) = \frac{1}{5}\left(\frac{1}{2 \cdot RSRQ_k} - \frac{6}{SINR_k} - 1\right)$$ (Formula (1-1))

[Math. 2]
$$u_k = (1.2 - \alpha) - \frac{12}{5} \cdot \frac{N_{RB} \cdot RSRP_k}{RSSI} = (1.2 - \alpha) - \frac{12}{5} \cdot RSRQ_k$$ (Formula (1-2))

[Math. 3]
$$u_k = \frac{RSSI}{12 \cdot N_{RB} \cdot RSRP_k} - \frac{1}{SINR_k} = \frac{1}{12 \cdot RSRQ_k} - \frac{1}{SINR_k}$$ (Formula (1-3))

[Math. 4]
$$u_k = \frac{1}{5}\left(\frac{1}{P} \cdot \frac{RSSI}{2 \cdot N_{RB} \cdot RSRP_k} - \frac{6}{SINR_k} - 1\right) = \frac{1}{5}\left(\frac{1}{P} \cdot \frac{1}{2 \cdot RSRQ_k} - \frac{6}{SINR_k} - 1\right)$$ (Formula (1-4))

[Math. 5]
$$u_k = \left(1 + \frac{1}{5 \cdot P} - \alpha\right) - \left(2 + \frac{2}{5 \cdot P}\right) \cdot \frac{12}{5} \cdot \frac{N_{RB} \cdot RSRP_k}{RSSI} = \left(1 + \frac{1}{5 \cdot P} - \alpha\right) - \left(2 + \frac{2}{5 \cdot P}\right) \cdot RSRQ_k$$ (Formula (1-5))

[Math. 6]
$$u_k = \frac{1}{P} \cdot \frac{RSSI}{12 \cdot N_{RB} \cdot RSRP_k} - \frac{1}{SINR_k} = \frac{1}{P} \cdot \frac{1}{12 \cdot RSRQ_k} - \frac{1}{SINR_k}$$ (Formula (1-6))

[Math. 7]
$$u_k = \frac{1}{5 \cdot P}\left(\frac{RSSI/N_{RB}}{2 \cdot N_{RB} \cdot RSRP_k} - \frac{6}{SINR_k} - 1\right) = \frac{1}{5 \cdot P}\left(\frac{1}{2 \cdot RSRQ_k} - \frac{6}{SINR_k} - 1\right)$$ (Formula (1-7))

[Math. 8]
$$u_k = \frac{1}{P}\left\{(1.2 - \alpha) - \frac{12}{5} \cdot \frac{N_{RB} \cdot RSRP_k}{RSSI}\right\} = \frac{1}{P}\left\{(1.2 - \alpha) - \frac{12}{5} \cdot RSRQ_k\right\}$$ (Formula (1-8))

[Math. 9]
$$u_k = \frac{1}{P}\left\{\frac{RSSI}{12 \cdot N_{RB} \cdot RSRP_k} - \frac{1}{SINR_k}\right\} = \frac{1}{P}\left\{\frac{1}{12 \cdot RSRQ_k} - \frac{1}{SINR_k}\right\}$$ (Formula (1-9))

[Math. 10]
$$u_k = \frac{1}{4 \cdot N_{TX}}\left(\frac{RSSI}{2 \cdot N_{RB} \cdot RSRP_k} - \frac{6}{SINR_k} - 2\right) = \frac{1}{4 \cdot N_{TX}}\left(\frac{1}{2 \cdot RSRQ_k} - \frac{6}{SINR_k} - 2\right)$$ (Formula (2-1))

[Math. 11]
$$u_k = (1.25 \cdot N_{TX} - \alpha) - \frac{5}{2} \cdot N_{TX} \cdot \frac{N_{RB} \cdot RSRP_k}{RSSI} = (1.25 \cdot N_{TX} - \alpha) - \frac{5}{2} \cdot N_{TX} \cdot RSRQ_k$$ (Formula (2-2))

[Math. 12]
$$u_k = \frac{1}{5 \cdot N_{TX}}\left(\frac{RSSI}{2 \cdot N_{RB} \cdot RSRP_k} - \frac{6}{SINR_k} - 1\right) = \frac{1}{5 \cdot N_{TX}}\left(\frac{1}{2 \cdot RSRQ_k} - \frac{6}{SINR_k} - 1\right)$$ (Formula (2-3))

[Math. 13]
$$u_k = \frac{1}{4 \cdot N_{TX}}\left(\frac{1}{P} \cdot \frac{RSSI}{2 \cdot N_{RB} \cdot RSRP_k} - \frac{6}{SINR_k} - 2\right) = \frac{1}{4 \cdot N_{TX}}\left(\frac{1}{P} \cdot \frac{1}{2 \cdot RSRQ_k} - \frac{6}{SINR_k} - 2\right)$$ (Formula (2-4))

[Math. 14]
$$u_k = \left(1 + \frac{1}{4 \cdot P} \cdot N_{TX} - \alpha\right) - \left(2 + \frac{2}{2 \cdot P}\right) \cdot N_{TX} \cdot \frac{N_{RB} \cdot RSRP_k}{RSSI} = \left(1 + \frac{1}{4 \cdot P} \cdot N_{TX} - \alpha\right) - \left(2 + \frac{2}{2 \cdot P}\right) \cdot N_{TX} \cdot RSRQ_k$$ (Formula (2-5))

[Math. 15]
$$u_k = \frac{1}{5 \cdot N_{TX}}\left(\frac{1}{P} \cdot \frac{RSSI}{2 \cdot N_{RB} \cdot RSRP_k} - \frac{6}{SINR_k} - 1\right) = \frac{1}{5 \cdot N_{TX}}\left(\frac{1}{P} \cdot \frac{1}{2 \cdot RSRQ_k} - \frac{6}{SINR_k} - 1\right)$$ (Formula (2-6))

[Math. 16]
$$u_k = \frac{1}{4 \cdot P \cdot N_{TX}}\left(\frac{RSSI}{2 \cdot N_{RB} \cdot RSRP_k} - \frac{6}{SINR_k} - 2\right) = \frac{1}{4 \cdot P \cdot N_{TX}}\left(\frac{1}{2 \cdot RSRQ_k} - \frac{6}{SINR_k} - 2\right)$$ (Formula (2-7))

[Math. 17]
$$u_k = \frac{1}{P}\left\{(1.25 \cdot N_{TX} - \alpha) - \frac{5}{2} \cdot N_{TX} \cdot \frac{N_{RB} \cdot RSRP_k}{RSSI}\right\} = \frac{1}{P}\left\{(1.25 \cdot N_{TX} - \alpha) - \frac{5}{2} \cdot N_{TX} \cdot RSRQ_k\right\}$$ (Formula (2-8))

[Math. 18]
$$u_k = \frac{1}{5 \cdot P \cdot N_{TX}}\left(\frac{RSSI}{2 \cdot N_{RB} \cdot RSRP_k} - \frac{6}{SINR_k} - 1\right) = \frac{1}{5 \cdot P \cdot N_{TX}}\left(\frac{1}{2 \cdot RSRQ_k} - \frac{6}{SINR_k} - 1\right)$$ (Formula (2-9))

On the other hand, if the number of antennas $N_{TX}$ used for signal transmission of the cell k of the wireless base station is two or more, the communication load $u_k$ may be calculated by using any one of the following formulae (2-1), (2-2), (2-3), (2-4), (2-5), (2-6), (2-7), (2-8), and (2-9). The calculation formula is not limited thereto, but any other mathematical formula predetermined according to the resource block configuration may be used.

In the above, $RSRQ_k$ represents a ratio between $RSRP_k$ and RSSI in the cell k of the wireless base station as the object of estimation. Additionally, α represents an adjustment term of noise power or the like. Moreover, P represents an adjustment term of transmission power in the case where the wireless base station transmits a signal. Further, although $N_{RB}$ is used in the right side of the first equal sign (=) in each of the above formulae, $N_{RB}$ can be determined by the following formula (3) or the like, for example, if $N_{RB}$ is not known. The right side of the second equal sign (=) in each of the above formulae is obtained by converting the right side of the first equal sign (=) to a formula without $N_{RB}$ by using the formula (3). Moreover, predetermined values may be used as α and P.

$$N_{RB}=RSSI \times RSRQ/RSRP \qquad (3)$$

As described above, according to this exemplary embodiment, the communication load of the wireless base station is able to be estimated with high accuracy even if the number of antennas used for signal transmission of the wireless base station changes. This is because the communication load of the wireless base station is estimated by using the network parameter P1, the first quality indicator Q1, and the second quality indicator Q2. Particularly, a difference in the resource block configuration is reflected to the estimation by using a formula that depends on whether the number of antennas is one or two or more. Therefore the communication load can be estimated with high accuracy in comparison with a method of finding a communication load assuming that the number of antenna is one.

Exemplary Embodiment 2

Figure 5:
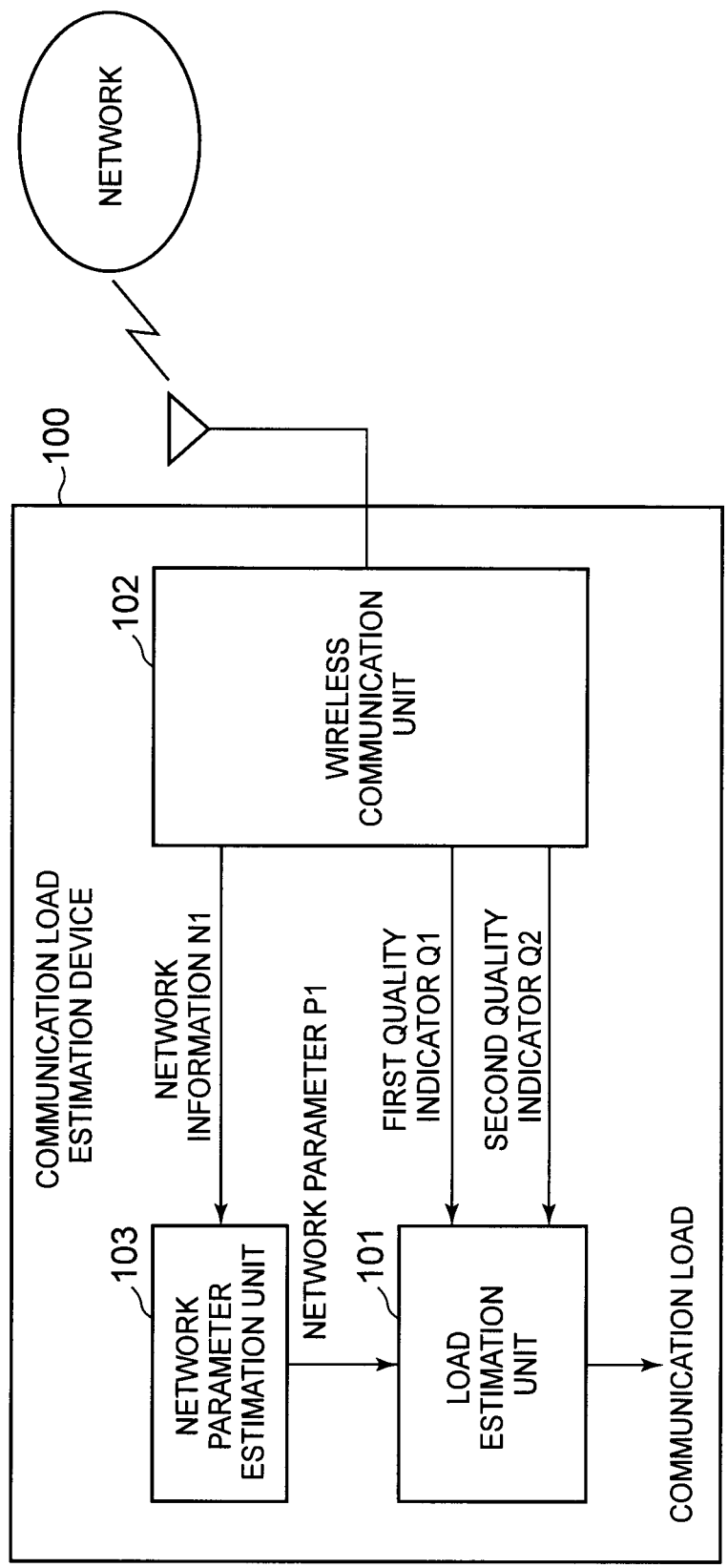
FIG. 5 is a block diagram illustrating a configuration example of a communication load estimation device of a second exemplary embodiment.

Subsequently, description will be made on a second exemplary embodiment of the present invention. FIG. 5 is a block diagram illustrating a configuration example of a communication load estimation device according to a second exemplary embodiment. The communication load estimation device 100 illustrated in FIG. 5 differs from the configuration of the first exemplary embodiment illustrated in FIG. 1 in that the communication load estimation device 100 further includes a network parameter estimation unit 103. In addition, the communication load estimation device 100 differs from the configuration of the first exemplary embodiment in that the wireless communication unit 102 acquires network information N1, instead of the network parameter P1.

In this exemplary embodiment, the network parameter estimation unit 103 derives the network parameter P1 by using the network information N1 concerning the number of antennas used for signal transmission of the wireless base station that the wireless communication unit 102 has acquired.

The network information N1 is not particularly limited as far as the information is associated with the number of antennas used for signal transmission of the wireless base station. The network information N1 may be, for example, a transmission mode. Furthermore, the network information N1 may be, for example, an identification number (ID) that identifies a wireless base station or a cell of the wireless base station.

The wireless communication unit 102 acquires, for example, network information N1 concerning the number of antennas used for signal transmission of the wireless base station, the first quality indicator Q1, and the second quality indicator Q2 by, for example, observing waves.

The processing unit for acquiring the network information N1 may be other than the wireless communication unit 102. For example, the network parameter estimation unit 103 may acquire the network information N1 which is set in advance. Specifically, the network information N1 may be acquired via the wireless communication unit 102 and further may be acquired by reading information set in advance, for example. In that case, the information stored in advance in a storage device in the communication load estimation device 100 or in a wireless terminal having the wireless communication unit 102 may be used as the network information N1.

The network parameter estimation unit 103 derives the network parameter P1 from the network information N1. The network parameter estimation unit 103 may derive the network parameter P1 on the basis of predetermined correspondence between the network information N1 and the network parameter P1.

For example, the communication load estimation device 100 may store information indicating the correspondence between the number of antennas used for signal transmission of the wireless base station and the network information N1 in advance or may store the information indicating the correspondence between them in advance in a server device or the like accessible from the communication load estimation device 100 so that the network parameter estimation unit 103 is able to query the correspondence between them, if necessary.

The network parameter estimation unit 103 may be implemented by, for example, the CPU or the like included in the communication load estimation device 100 (for example, a wireless terminal or an information processing device such as a server device or the like connected via a communication network to the wireless terminal having a wireless communication unit 102). Other respects are the same as those of the first exemplary embodiment.

Figure 6:
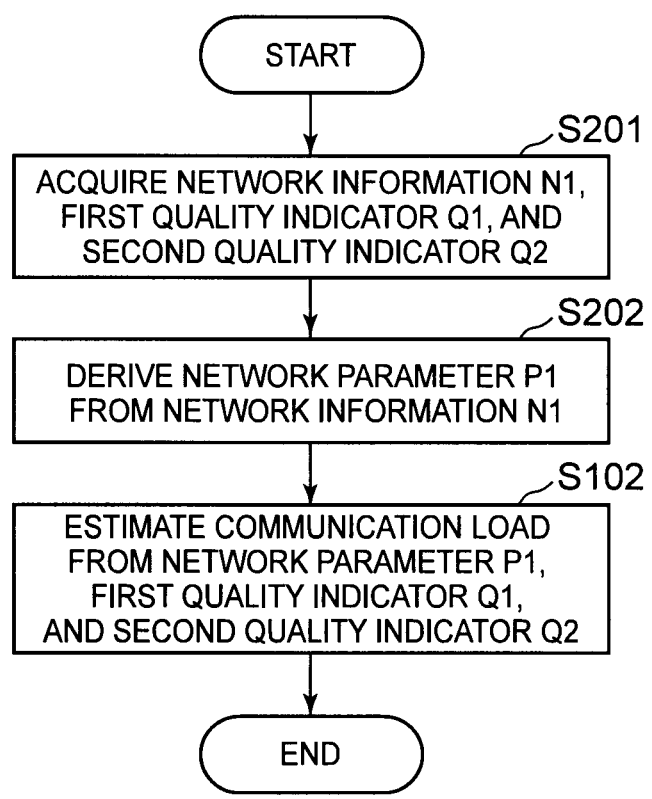
FIG. 6 is a flowchart illustrating an example of an operation of the communication load estimation device of the second exemplary embodiment.

Subsequently, the operation of this exemplary embodiment will be described. FIG. 6 is a flowchart illustrating an example of an operation of the communication load estimation device 100 of this exemplary embodiment. Incidentally, the same processes as in the first exemplary embodiment are denoted by the same reference numerals and the description thereof is omitted.

In the example illustrated in FIG. 6, first, the wireless communication unit 102 acquires network information N1, the first quality indicator Q1, and the second quality indicator Q2 (step S201). Subsequently, the network parameter estimation unit 103 derives the network parameter P1 from the acquired network information N1 (step S202). Thereafter, the load estimation unit 101 estimates (calculates) the communication load of the wireless base station on the basis of the network parameter P1, the first quality indicator Q1, and the second quality indicator Q2 (step S102).

As described above, according to this exemplary embodiment, the same advantageous effects as in the first exemplary embodiment can be achieved even in a situation where the communication load estimation device 100 cannot directly acquire the network parameter P1.

Exemplary Embodiment 3

Figure 7:
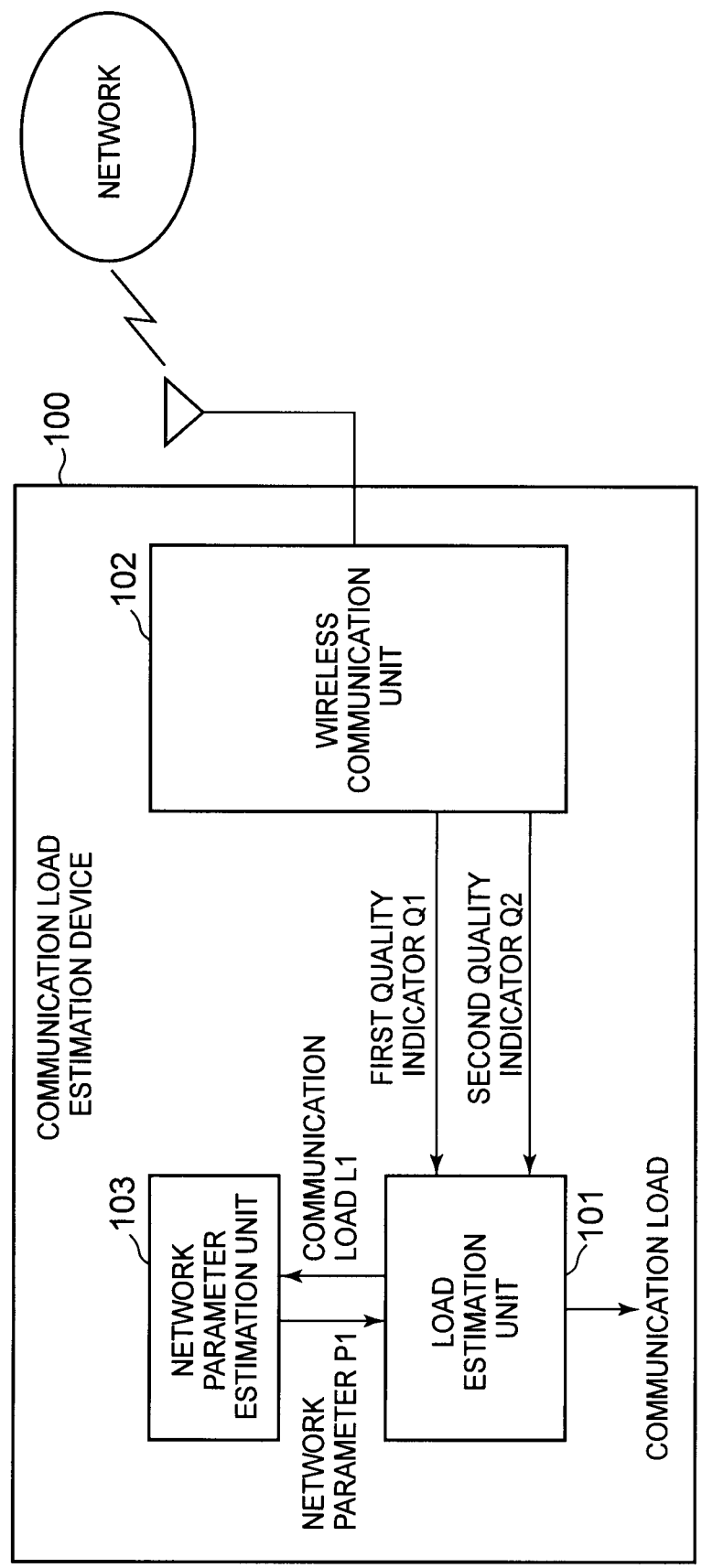
FIG. 7 is a block diagram illustrating a configuration example of a communication load estimation device of a third exemplary embodiment.

Subsequently, description will be made on a third exemplary embodiment of the present invention. FIG. 7 is a block diagram illustrating a configuration example of a communication load estimation device according to a third exemplary embodiment. The communication load estimation device 100 illustrated in FIG. 7 differs from the configuration of the second exemplary embodiment illustrated in FIG. 5 in that the network parameter estimation unit 103 outputs the network parameter P1 with a communication load L1 from the load estimation unit 101 as an input. In addition, the communication load estimation device 100 differs from the configuration of the second exemplary embodiment in that the processing of acquiring the network information N1 in the wireless communication unit 102 is omitted.

In this exemplary embodiment, the load estimation unit 101 calculates the communication load L1, which is a provisional communication load of the wireless base station, by using the first quality indicator Q1 and the second quality indicator Q2 acquired by the wireless communication unit 102. The network parameter estimation unit 103 then calculates the network parameter P1 by using the communication load L1. Other respects may be the same as those of the second exemplary embodiment.

The communication load L1 is a value of the communication load or a set thereof (for example, time-series data) calculated by using the first quality indicator Q1 and the second quality indicator Q2. The communication load L1 may be one determined by, for example, assuming that the number of antennas used for signal transmission of the wireless base station is one. More specifically, the communication load L1 may be a value of a communication load or the time-series data thereof calculated by the above formula (1-1) or the like.

The network parameter estimation unit 103 derives the network parameter P1 by analyzing the value of the communication load L1 or a set thereof. The network parameter estimation unit 103 may analyze, for example, the range of value of the communication load L1 and derive the network parameter P1 according to the range of value.

For example, all of the above formulae (1-1), (1-2), and (1-3) are designed so that the communication load theoretically varies between 0 and 1. As an example of deriving the network parameter P1, the network parameter P1 (more specifically, the number of antennas) is determined to be one if a communication load L1 varies between 0 and 1 from the time-series data of the communication load L1, under the above conditions and assuming that such communication load is the communication load L1, and the network parameter P1 is determined to be two if the communication load L1 varies between 0.2 to 1.0, or the like.

Figure 8:
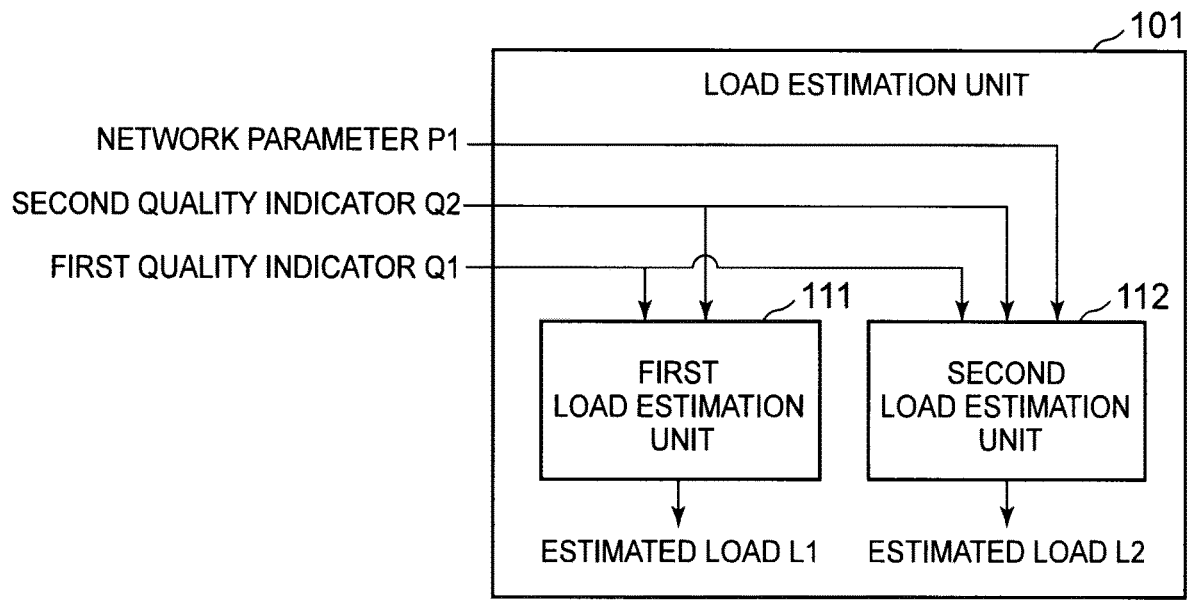
FIG. 8 is a block diagram illustrating a configuration example of a load estimation unit 101.

FIG. 8 is a block diagram illustrating a configuration example of a load estimation unit 101 of this exemplary embodiment. As illustrated in FIG. 8, the load estimation unit 101 of this exemplary embodiment may include a first load estimation unit 111 and a second load estimation unit 112.

The first load estimation unit 111 in the load estimation unit 101 calculates the communication load L1, which is a provisional communication load of the wireless base station, by using the first quality indicator Q1 and the second quality indicator Q2.

The second load estimation unit 112 calculates a communication load L2, which is a (original) communication load of the wireless base station as the object of estimation by using the first quality indicator Q1, the second quality indicator Q2, and the network parameter P1. The communication load L2 corresponds to the communication load $u_k$ described above.

Figure 9:
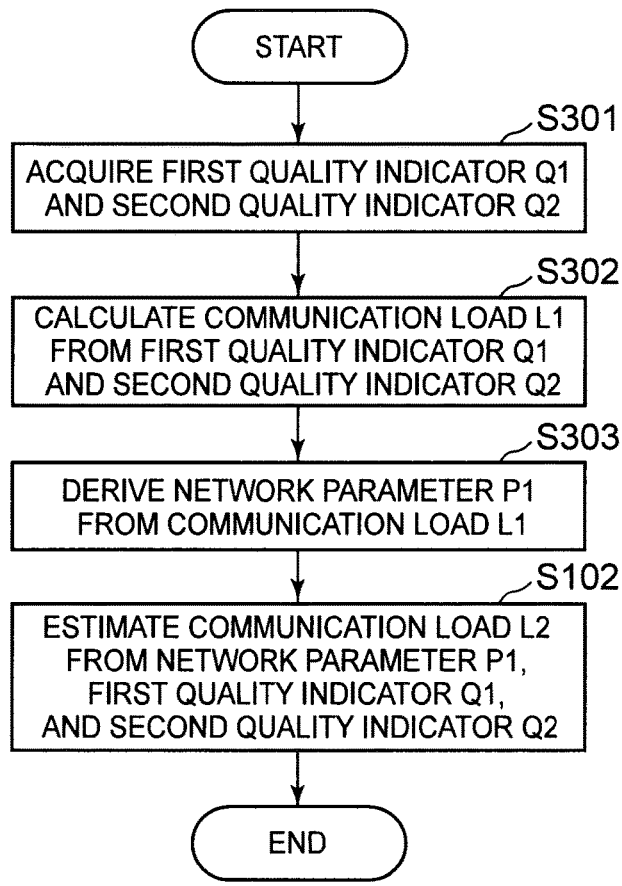
FIG. 9 is a flowchart illustrating an example of an operation of the communication load estimation device of the third exemplary embodiment.

Subsequently, the operation of this exemplary embodiment will be described. FIG. 9 is a flowchart illustrating an example of the operation of the communication load estimation device 100 of this exemplary embodiment. Incidentally, the same processes as in the first exemplary embodiment are denoted by the same reference numerals, and description thereof is omitted.

In the example illustrated in FIG. 9, first, the wireless communication unit 102 acquires the first quality indicator Q1 and the second quality indicator Q2 (step S301). Subsequently, the load estimation unit 101 (more specifically, the first load estimation unit 111) calculates the provisional communication load (communication load L1) by using the acquired first quality indicator Q1 and second quality indicator Q2 (step S302). Subsequently, the network parameter estimation unit 103 derives the network parameter P1 on the basis of the calculated communication load L1 (step S303). Finally, the load estimation unit 101 (more specifically, the second load estimation unit 112) estimates (calculates) the communication load L2 on the basis of the network parameter P1, the first quality indicator Q1, and the second quality indicator Q2 (step S102).

For example, the processing of steps S301 to S302 may also be repeated until the communication load L1 of a predetermined amount is acquired. Further, for example, information indicating the number of antennas (=1) is set to the initial value of the network parameter P1 in advance and the network parameter P1 may be updated appropriately on the basis of the communication load L1 of the latest predetermined amount of communication load L1 while the processing of steps S301 to S102 is repeated.

As described above, according to this exemplary embodiment, the same advantageous effects as in the first exemplary embodiment can be achieved even in a situation where the communication load estimation device 100 cannot directly acquire the network parameter P1 and the network information N1.

Exemplary Embodiment 4

Figure 10:
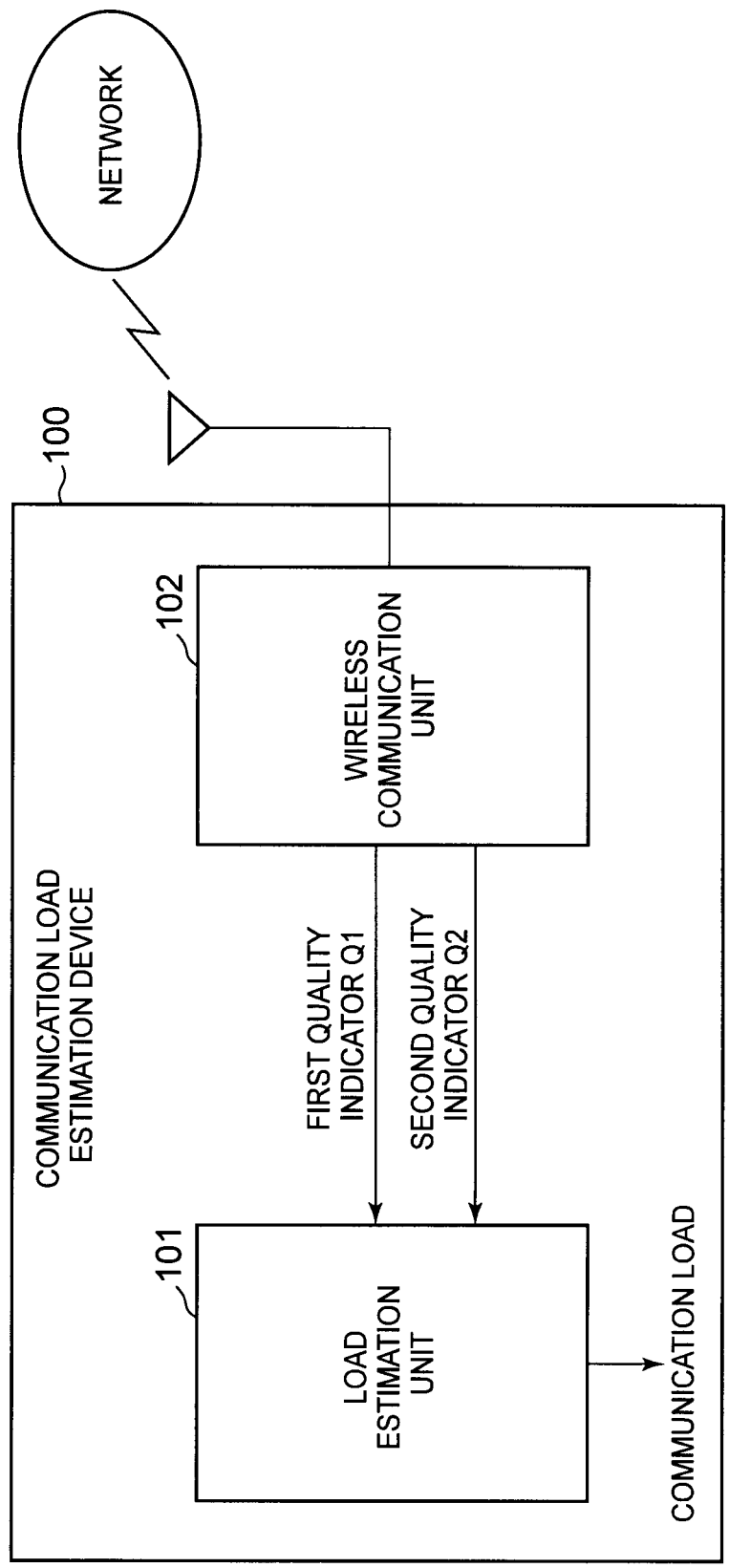
FIG. 10 is a block diagram illustrating a configuration example of a communication load estimation device of a fourth exemplary embodiment.

Subsequently, description will be made on a fourth exemplary embodiment of the present invention. FIG. 10 is a block diagram illustrating a configuration example of a communication load estimation device of the fourth exemplary embodiment. A communication load estimation device 100 illustrated in FIG. 10 is different from the configuration of the third exemplary embodiment illustrated in FIG. 7 in that the network parameter estimation unit 103 is omitted.

In this exemplary embodiment, similarly to the third exemplary embodiment, the load estimation unit 101 calculates the communication load L1, which is a provisional communication load of the wireless base station, by using the first quality indicator Q1 and the second quality indicator Q2 acquired by the wireless communication unit 102. The load estimation unit 101, then, derives the communication load L2, which is the object of estimation, by using the communication load L1.

The communication load L1 is a communication load that is calculated by using the first quality indicator Q1 and the second quality indicator Q2. Similarly to the third exemplary embodiment, the communication load L1 may be one that is found by assuming that the number of antennas used for signal transmission of the wireless base station is one.

The load estimation unit 101 of this exemplary embodiment derives the communication load L2 by analyzing the value of the communication load L1 or a set thereof (for example, time-series data). The load estimation unit 101 may analyze, for example, the range of value of the communication load L1, adjust the magnification, the offset, or both of the magnification and the offset of the communication load L1 according to the range of value of the communication load L1, and calculate a scale of the communication load L1 that has been changed so as to fall within the assumed range of value as the communication load L2. Incidentally, the communication load L2 is a communication load that is the object of estimation.

For example, the communication load L1 is designed so as to vary between 0 and 1. Under this situation, in the case where it is determined that the range of value of the obtained communication load L1 is wider or narrower (a predetermined percentage or less relative to the range of value or the like) than the range of 0 to 1, the communication load L1 may be corrected so that the range of value falls within the range of 0 to 1 to calculate the communication load L2. At this time, the correction may be made assuming that the communication load L2 varies between 0 and 1 without fail.

Figure 11:
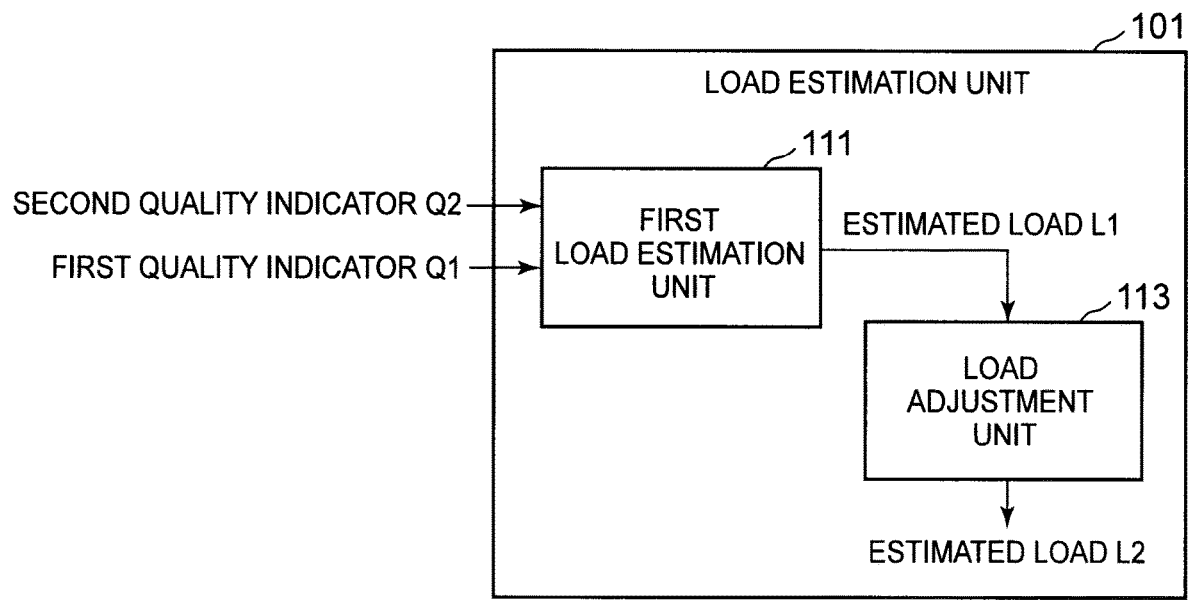
FIG. 11 is a block diagram illustrating a configuration example of a load estimation unit 101.

FIG. 11 is a block diagram illustrating a configuration example of the load estimation unit 101 of this exemplary embodiment. As illustrated in FIG. 11, the load estimation unit 101 of this exemplary embodiment may include a first load estimation unit 111 and a load adjustment unit 113.

The first load estimation unit 111 in the load estimation unit 101 calculates the communication load L1, which is a provisional communication load of the wireless base station, by using the first quality indicator Q1 and the second quality indicator Q2, similarly to the third exemplary embodiment.

The load adjustment unit 113 analyzes the value of the communication load L1 or a set thereof to derive the communication load L2.

Figure 12:
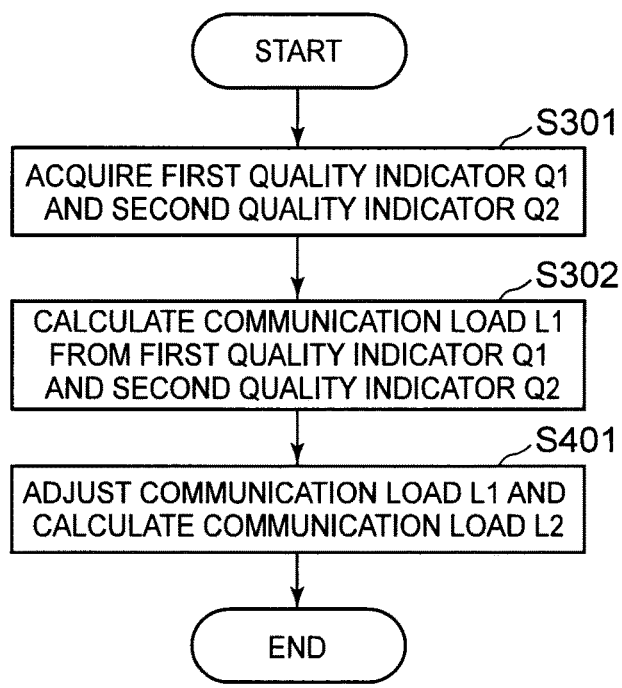
FIG. 12 a flowchart illustrating an example of an operation of the communication load estimation device of the fourth exemplary embodiment.

Subsequently, the operation of this exemplary embodiment will be described. FIG. 12 is a flowchart illustrating an example of the operation of the communication load estimation device 100 of this exemplary embodiment. Incidentally, the same processes as those of the third exemplary embodiment are denoted by the same reference numerals, and description thereof is omitted.

In the example illustrated in FIG. 12, first, the wireless communication unit 102 acquires the first quality indicator Q1 and the second quality indicator Q2 (step S301). Subsequently, the load estimation unit 101 (more specifically, the first load estimation unit 111) calculates a provisional communication load (communication load L1) by using the acquired first quality indicator Q1 and second quality indicator Q2 (step S302). Finally, the load estimation unit 101 (more specifically, the load adjustment unit 113) adjusts the communication load L1, if necessary, and then calculates the communication load L2 (step S401).

As described above, according to this exemplary embodiment, the communication load can be accurately calculated even in a situation where the communication load estimation device 100 cannot directly acquire the network parameter P1 and the network information N1. This is because, even after the number of antennas is fixed to a certain value (for example, 1) for the calculation, the value of the communication load based on an appropriate number of antennas can be calculated by determining the consistency of the range of value.

Figure 13:
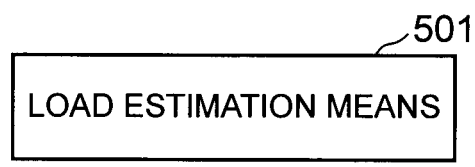
FIG. 13 a block diagram illustrating an outline of the present invention.

Subsequently, an outline of the present invention will be described. FIG. 13 is a block diagram illustrating the outline of the present invention. As illustrated in FIG. 13, the communication load estimation system or the information processing device of the present invention includes a load estimation means 501.

A load estimation unit 501 (for example, the load estimation unit 101) estimates a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

With this configuration, the relationship between indicators depending on the number of antennas used for signal transmission of the wireless base station can be reflected on the method of calculating the communication load. Therefore, the communication load of the wireless base station is able to be estimated accurately.

The load estimation unit 501 may estimate the communication load of the wireless base station on the basis of a result of subtracting a component containing the interference noise component included in the signal to interference noise ratio from the component containing the total received power.

The load estimation unit 501 may determine a formula to be used out of two or more formulae according to the number of antennas used for signal transmission of the wireless base station, which is indicated by the network parameter.

For example, the formula to be selected may include a term with a ratio between the total received power and the received power of a reference signal per one resource block in a symbol to be measured such as RSSI, RSRP, or the like.

The communication load estimation system or the information processing device of the present invention may include a network information acquisition means (not illustrated) for acquiring network information associated with the number of antennas used for signal transmission of a wireless base station as the object of estimation and a network parameter deriving means (not illustrated) for deriving the network parameter from the network information.

Furthermore, the communication load estimation system or the information processing device of the present invention may include a provisional load calculation means (not illustrated) for calculating a provisional communication load of the wireless base station by using the first quality measurement value and the second quality measurement value and a network parameter deriving means (not illustrated) for deriving the network parameter on the basis of the provisional communication load.

Figure 14:
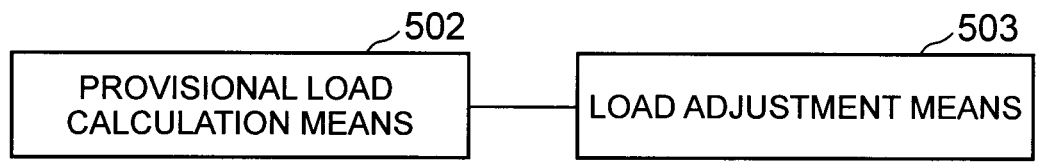
FIG. 14 is a block diagram illustrating another configuration example of a communication load estimation system or an information processing device of the present invention.

Moreover, FIG. 14 is a block diagram illustrating another configuration example of the communication load estimation system or the information processing device of the present invention. As illustrated in FIG. 14, the communication load estimation system or the information processing device of the present invention may include a provisional load calculation means 502 and a load adjustment means 503.

The provisional load calculation means 502 (for example, the first load estimation unit 111) calculates a provisional communication load of a wireless base station to be an object of estimation by using a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

The load adjustment means 503 (for example, the load adjustment unit 113) estimates the communication load of the wireless base station by adjusting the magnification or offset of the provisional communication load or both thereof on the basis of the range of value of the provisional communication load represented by a set of the provisional communication loads.

This configuration enables detection of an inconsistency in the range of value of the provisional communication load and calculation of the value of the communication load based on an appropriate number of antennas, thereby enabling accurate estimation of the communication load of the wireless base station.

Incidentally, the above exemplary embodiments may also be described as in the following supplementary note.

(Supplementary note 1) A communication load estimation system including load estimation means for estimating a communication load of a wireless base station to be an object of estimation, using at least: a network parameter, which is a parameter concerning the number of antennas used for signal transmission of the wireless base station: a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal.

(Supplementary note 2) The communication load estimation system described in Supplementary note 1, wherein a communication load $u_k$ is calculated by any one of the above formulae (1-1), (1-2), (1-3), (1-4), (1-5), (1-6), (1-7), (1-8), and (1-9), where $u_k$ represents a communication load estimated by the load estimation means.

(Supplementary note 3) The communication load estimation system described in Supplementary note 1, wherein a communication load $u_k$ is calculated by any one of the above formulae (2-1), (2-2), (2-3), (2-4), (2-5), (2-6), (2-7), (2-8), and (2-9), where $u_k$ is a communication load estimated by the load estimation means.

(Supplementary note 4) The communication load estimation system described in Supplementary note 1, wherein the load estimation means calculates the communication load by using any one of the above formulae (1-1), (1-2), (1-3), (1-4), (1-5), (1-6), (1-7), (1-8), and (1-9) if the number of antennas used for signal transmission of a wireless base station indicated by a network parameter is one and wherein the communication load is calculated by using any one of the above formulae (2-1), (2-2), (2-3), (2-4), (2-5), (2-6), (2-7), (2-8), and (2-9) if the number of antennas is two.

(Supplementary note 5) The communication load estimation system described in Supplementary note 1, which includes provisional load calculation means for calculating a provisional communication load of the wireless base station by using the first quality measurement value and the second quality measurement value and network parameter deriving means for deriving the network parameter on the basis of the provisional communication load, wherein the network parameter deriving means derives the network parameter on the basis of the range of value of the provisional communication load indicated by a set of provisional communication loads.

(Supplementary note 6) An information processing device including: provisional load calculation means for calculating at least one provisional communication load of a wireless base station to be an object of estimation, using at least a first quality measurement value, which is a measurement value concerning a quality of communication with the wireless base station and which includes at least total received power, and a second quality measurement value, which is a measurement value concerning a quality of communication with the wireless base station and which includes at least a signal to interference noise ratio of a reference signal; and load adjustment means for estimating the communication load of the wireless base station by adjusting the magnification or offset of the provisional communication load or both thereof, based on the range of value of the provisional communication load represented by a set of the provisional communication loads.

(Supplementary note 7) A communication load estimation method wherein an information processing device, which is connectable to a wireless terminal or a wireless communication means included in the wireless terminal, calculates at least one provisional communication load of a wireless base station to be an object of estimation by using a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal, adjusts the magnification or offset of the provisional communication load or both thereof, based on the range of value of the provisional communication load represented by a set of the calculated provisional communication loads, and estimates a communication load of the wireless base station.

(Supplementary note 8) A communication load estimation program for causing a computer to perform processing of calculating at least one provisional communication load of a wireless base station to be an object of estimation by using a first quality measurement value, which is a measurement value concerning a quality of communication with the wireless base station and which includes at least total received power; and a second quality measurement value, which is a measurement value concerning a quality of communication with the wireless base station and which includes at least a signal to interference noise ratio of a reference signal, and processing of adjusting the magnification or offset of the provisional communication load or both thereof, based on the range of value of the provisional communication load represented by a set of the calculated provisional communication loads and estimating a communication load of the wireless base station.

Although the present invention has been described with reference to the exemplary embodiments and examples, the present invention is not limited to the above exemplary embodiments and examples. Various modifications, which can be understood by those skilled in the art, may be made in the configuration and details of the present invention within the scope thereof.

INDUSTRIAL APPLICABILITY

The present invention is applicable to a system that collects communication load information of a wireless base station or the like. In addition, the present invention is also applicable to a wireless communication system using a communication load of a wireless base station such as, for example, a wireless communication system that performs optimization of a wireless parameter, network setting, communication timing, and a communication bit rate.

REFERENCE SIGNS LIST

100 Communication load estimation device
101 Load estimation unit
102 Wireless communication unit
103 Network parameter estimation unit
111 First load estimation unit
112 Second load estimation unit
113 Load adjustment unit 501 Load estimation means
502 Provisional load calculation means
503 Load adjustment means

The invention claimed is:

1. A communication load estimation system comprising:
a memory storing instructions; and
one or more processors configured to execute the instructions to:
- calculate a provisional communication load of a wireless base station by using a first quality measurement value and a second quality measurement value;
- derive a number of antennas used by the wireless base station for signal transmission, based on the provisional communication load;
- select a first formula, from among two or more formulae used for signal transmission of the wireless base station, based on the derived number of antennas; and
- calculate, based on the selected first formula, a communication load of the wireless base station to be an object of estimation, using at least:
  - the derived number of antennas;
  - the first quality measurement value, which is a measurement value concerning a quality of communication with the wireless base station and which includes at least total received power; and
  - the second quality measurement value, which is a measurement value concerning a quality of communication with the wireless base station and which includes at least a signal to interference noise ratio of a reference signal.

2. The communication load estimation system according to claim 1, wherein the one or more processors is further configured to execute the instructions to calculate the communication load of the wireless base station, based on a result of subtracting a component containing an interference noise component included in the signal to interference noise ratio from a component containing the total received power.

3. The communication load estimation system according to claim 1, wherein the one or more processors is further configured to calculate the communication load of the wireless base station by using a formula including a term with a ratio between the total received power and the received power of the reference signal per one resource block in a symbol to be measured for the total received power or the signal to interference noise ratio.

4. A computer-implemented communication load estimation method executed by an information processing device, which is connectable to a wireless terminal or a wireless communication unit, comprising:
- calculating a provisional communication load of a wireless base station by using a first quality measurement value and a second quality measurement value;
- deriving a number of antennas used by the wireless base station for signal transmission, based on the provisional communication load;
- selecting a first formula, from among two or more formulae used for signal transmission of the wireless base station, based on a number of antennas indicated by a network parameter; and
- calculating, based on the selected first formula, a communication load of the wireless base station to be an object of estimation, using at least:
  - the derived number of antennas;
  - the first quality measurement value, which is a measurement value concerning a quality of communication with the wireless base station and which includes at least total received power; and
  - the second quality measurement value, which is a measurement value concerning a quality of communication with the wireless base station and which includes at least a signal to interference noise ratio of a reference signal.

5. A non-transitory computer readable recording medium in which a communication load estimation program is recorded, the communication load estimation program for causing a computer to perform:
- calculating a provisional communication load of a wireless base station by using a first quality measurement value and a second quality measurement value;
- deriving a number of antennas used by the wireless base station for signal transmission, based on the provisional communication load;
- selecting a first formula, from among two or more formulae used for signal transmission of the wireless base station, based on a number of antennas indicated by a network parameter; and
- calculating, based on the selected first formula, a communication load of the wireless base station to be an object of estimation, using at least:
  - the derived number of antennas;
  - the first quality measurement value, which is a measurement value concerning a quality of communication with the wireless base station and which includes at least total received power; and
  - the second quality measurement value, which is a measurement value concerning a quality of communication with the wireless base station and which includes at least a signal to interference noise ratio of a reference signal.

* * * * *

UNITED STATES PATENT AND TRADEMARK OFFICE
CERTIFICATE OF CORRECTION

PATENT NO. : 10,873,873 B2
APPLICATION NO. : 16/065188
DATED : December 22, 2020
INVENTOR(S) : Eiji Takahashi et al.

Page 1 of 1

It is certified that error appears in the above-identified patent and that said Letters Patent is hereby corrected as shown below:

On the Title Page

Column 2, item (56), Foreign Patent Documents, Line 3; After "10/2015", insert --¶WO 2014/087671 A1 12/2014--

Column 2, item (56), Foreign Patent Documents, Line 2; After "2017 [PCT/ISA/210].", insert --¶Decision to Grant Patent issued in Japanese Patent Application No. 2017-560084; dated Nov. 17, 2020.--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*